(12) United States Patent
Silva

(10) Patent No.: US 9,403,224 B1
(45) Date of Patent: Aug. 2, 2016

(54) COMBINED CHOP SAW AND WORK TABLE AND ASSOCIATED USE THEREOF

(76) Inventor: Carlos Silva, Syosset, NY (US)

(*) Notice: Subject to any disclaimer, the term of this patent is extended or adjusted under 35 U.S.C. 154(b) by 1035 days.

(21) Appl. No.: 13/539,966

(22) Filed: Jul. 2, 2012

(51) Int. Cl.
*B26D 1/14* (2006.01)
*B26D 1/18* (2006.01)
*B23D 45/02* (2006.01)

(52) U.S. Cl.
CPC .................................... *B23D 45/024* (2013.01)

(58) Field of Classification Search
CPC .... B23D 45/024; B23D 47/025; B23D 45/04; B25H 1/04; B26D 1/03; B27B 5/16
USPC .................. 83/477.2, 486.1, 574, 471.3, 490; 144/286.1, 286.5, 1.1, 285, 187; 248/129, 646, 647, 676, 678
See application file for complete search history.

(56) References Cited

U.S. PATENT DOCUMENTS

| | | | | | |
|---|---|---|---|---|---|
| 1,313,107 | A | * | 8/1919 | Niewinski | B23D 47/025 83/477.2 |
| 1,470,166 | A | * | 10/1923 | Holland | B25H 3/023 144/285 |
| 2,020,216 | A | * | 11/1935 | Sarac | B23D 57/0092 144/285 |
| 2,695,210 | A | * | 11/1954 | Evans | B25H 3/006 190/11 |
| 2,759,507 | A | * | 8/1956 | Davis | B23D 57/0092 108/15 |
| 2,786,500 | A | * | 3/1957 | Unterfranz | B23D 47/025 144/285 |
| 2,803,275 | A | * | 8/1957 | Ruben | B27B 5/26 144/285 |
| 2,990,859 | A | * | 7/1961 | Ruben | B23D 57/0092 144/285 |
| 3,036,608 | A | * | 5/1962 | Weber | B23D 57/0092 144/285 |
| 3,556,623 | A | * | 1/1971 | Damljonaitis | B23D 57/0092 144/285 |
| 3,862,686 | A | * | 1/1975 | Kolarik | B25H 1/04 190/11 |
| 4,173,849 | A | * | 11/1979 | Mar | B23D 57/0076 144/1.1 |
| 4,209,045 | A | * | 6/1980 | Bassett | B23D 47/025 108/11 |
| 4,252,239 | A | * | 2/1981 | Snyder | B23D 57/0092 144/285 |
| RE30,689 | E | * | 7/1981 | Gray | B23D 57/0092 144/286.1 |
| 5,189,937 | A | * | 3/1993 | Garuglieri | B23D 45/048 83/471.3 |
| 5,193,598 | A | * | 3/1993 | Estrem | B23D 47/025 108/135 |
| 5,224,531 | A | * | 7/1993 | Blohm | B25H 3/00 108/110 |
| 5,437,319 | A | * | 8/1995 | Garuglieri | A47B 77/12 144/286.1 |

(Continued)

*Primary Examiner* — Ghassem Alie
*Assistant Examiner* — Bharat C Patel

(57) ABSTRACT

A combined chop saw and work table includes a carrying case having a cover and a support base removably attached thereto in such a manner that the carrying case is selectively configured between closed and open positions. A chop saw is selectively situated outside and inside of the carrying case when the carrying case is configured at the open and closed positions, respectively. When the carrying case is at the closed position, each of the cover and the support base are at a respective upright orientation. When the carrying case is at the open position, the support base is at the upright orientation and the cover is at an inverted orientation. The carrying case defines a work table when configured to the open position such that the chop saw is contemporaneously exposed above the cover and the support base.

14 Claims, 5 Drawing Sheets

(56) References Cited

U.S. PATENT DOCUMENTS

| | | | | |
|---|---|---|---|---|
| 5,497,816 A * | 3/1996 | Darland | B23D 47/025 | 144/286.5 |
| 5,526,897 A * | 6/1996 | Schiller | B23D 47/025 | 182/129 |
| 5,551,773 A * | 9/1996 | Cottrell | B25H 1/04 | 242/129 |
| 5,595,228 A * | 1/1997 | Meisner | B25H 1/04 | 144/285 |
| 5,863,052 A * | 1/1999 | Roman | B23D 47/025 | 144/286.1 |
| 5,873,463 A * | 2/1999 | Purcell | B25H 3/023 | 206/372 |
| 5,884,681 A * | 3/1999 | Nickles | B23D 47/025 | 144/286.1 |
| 6,155,318 A * | 12/2000 | Underwood | B23D 47/025 | 144/286.1 |
| 6,360,797 B1 * | 3/2002 | Brazell | B23D 47/025 | 144/286.1 |
| 6,523,583 B1 * | 2/2003 | Ruiz | B25H 1/12 | 108/115 |
| 7,077,179 B1 * | 7/2006 | Camiano | B25H 1/10 | 144/1.1 |
| 7,290,655 B1 * | 11/2007 | Wood | A45C 13/02 | 206/349 |
| 7,293,489 B1 * | 11/2007 | Wood | B23D 45/042 | 144/285 |
| 7,395,745 B2 * | 7/2008 | Gehret | B23D 47/02 | 83/468.3 |
| 7,543,704 B2 * | 6/2009 | Miller | B25H 1/04 | 190/11 |
| 7,647,956 B1 * | 1/2010 | Cona | B25H 1/12 | 144/286.5 |
| 7,752,699 B1 * | 7/2010 | Fruzzetti, Jr. | B08B 1/04 | 15/104.04 |
| 7,752,951 B2 * | 7/2010 | Ouellette | B27B 5/165 | 144/48.3 |
| 7,765,939 B2 * | 8/2010 | Chen | A47B 3/08 | 108/127 |
| 8,246,059 B2 * | 8/2012 | Gass | F16M 3/00 | 248/651 |
| 2005/0034783 A1 * | 2/2005 | Laird | B25H 1/04 | 144/286.5 |
| 2005/0072493 A1 * | 4/2005 | Velasco | B25H 1/04 | 144/286.1 |
| 2011/0232805 A1 * | 9/2011 | DeSpain | B25H 1/04 | 144/285 |

* cited by examiner

COMBINED CHOP SAW AND WORK TABLE AND ASSOCIATED USE THEREOF

CROSS REFERENCE TO RELATED APPLICATIONS

This application claims the benefit of U.S. Provisional Application No. 61/502,913, filed Jun. 30, 2011, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF NON-LIMITING EXEMPLARY EMBODIMENT(S) OF THE PRESENT DISCLOSURE

TECHNICAL FIELD

This disclosure relates to saws and, more particularly, to a mobile sawing worktable for providing users with an easy and convenient means of transporting and storing a chop saw in addition to enabling a quick set up of the portable worktable for use with the saw.

PRIOR ART

A chop/miter saw is a power tool which is typically used to cut hard materials, such as wood. Since their introduction, portable wood saws have made many building site jobs easier. With these saws, lightweight steel fabrication previously performed in workshops using stationary power band saws or chop/miter saws can be done on-site. Most of these types of saws are portable, with common blade sizes ranging from eight to 12 inches.

In use, the work piece is typically held against the edge of a stable structure such as a workbench to provide a proper cutting angle between the blade and the work piece edge. Apart from having to obtain a separate work table to place the chop saw, such a method requires special fixtures to clamp the saw and bench firmly together. The current arrangement is both tedious and time consuming and the chop saw may require regular adjustments and re-clamping to the workbench during the sawing process. This is to ensure a proper cut is made and that the chop saw is not loosened due to the vibrations of the chop saw when in use.

Accordingly, a need remains for an apparatus in order to overcome prior art shortcomings. The present disclosure satisfies such a need by providing a combined chop saw and work table that is convenient and easy to use, lightweight yet durable in design, versatile in its applications, and designed for transporting and storing a chop saw in addition to enabling a quick set up of a portable worktable for use with the chop saw.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a combined chop saw and work table. These and other objects, features, and advantages of the non-limiting exemplary embodiment(s) are provided by a combined chop saw and work table including a carrying case having a cover and a support base removably attached thereto in such a manner that the carrying case is selectively configured between closed and open positions, and a chop saw selectively situated outside and inside of the carrying case when the carrying case is configured at the open and closed positions, respectively.

Advantageously, when the carrying case is at the closed position, each of the cover and the support base are at a respective upright orientation. When the carrying case is at the open position, the support base is at the upright orientation and the cover is at an inverted orientation. In this manner, the carrying case defines a work table when configured to the open position such that the chop saw is contemporaneously exposed above the cover and the support base.

In a non-limiting exemplary embodiment, the cover preferably includes a closed top side provided with a top edge extending along an entire perimeter of the closed top side, an open bottom side provided with a bottom edge extending along an entire perimeter of the open bottom side, first and second legs pivotally coupled to the closed top side, and a compartment formed between the closed top side and the open bottom side. Advantageously, the first and second legs independently pivot along mutually exclusive first and second arcuate paths defined about first and second fulcrum axes respectively. Notably, the first fulcrum axis is registered parallel to the second fulcrum axis and the first and second arcuate paths are located exterior of the compartment.

In a non-limiting exemplary embodiment, the cover further includes a transport handle attached to an outer surface of the cover.

In a non-limiting exemplary embodiment, the support base includes an upper side provided with an upper rim extending along an entire perimeter of the upper side, a lower side provided with a lower rim extending along an entire perimeter of the lower side, and a plurality of wheels pivotally coupled to the opposed corners of the lower side. First and second rectilinear slots are oppositely formed between the upper and lower sides, and a cavity is formed between the upper and lower sides. First and second rectilinear support bars statically situated within the cavity. In this manner, the chop saw is directly supported on the first and second rectilinear support bars and extends above the upper side of the support base.

In a non-limiting exemplary embodiment, the support base further includes oppositely disposed first and second work table handles slidably displaced through the first and second rectilinear slots such that the work table handles are independently retracted and extended towards and away from the cavity, respectively.

In a non-limiting exemplary embodiment, each of the first and second work table handles preferably includes a rectilinear female portion situated entirely within the cavity, an L-shaped male portion slidably displaced within the rectilinear female portion as well as a corresponding one of the first and second rectilinear slots, and a T-shaped grip portion coupled to the L-shaped male portion and oriented perpendicular thereto. Notably, each T-shaped grip portion is detachable from the L-shaped male portion such that the L-shaped male portion interfits within the corresponding rectilinear slot while the carrying case is configured at the closed position.

In a non-limiting exemplary embodiment, the carrying case further includes a locking mechanism securing the bottom edge of the carrying case to the upper rim of the support base while the carrying case is configured at the closed position. Such a locking mechanism includes a plurality of straps attached to the cover and a plurality of clips attached to the support base. Such straps are removably coupled to the clips.

In a non-limiting exemplary embodiment, the first and second legs are articulated to an outwardly deployed position and thereby elevate the top side of the cover above a ground surface while the cover is at the inverted orientation.

In a non-limiting exemplary embodiment, the lower rim of the support base contiguously lies directly along the bottom edge of the cover while the carrying case is configured to the open position and the first and second legs are at the outwardly deployed position respectively.

The present disclosure further includes a method of utilizing a combined chop saw and work table. Such a method includes the chronological steps of: providing a carrying case having a cover and a support base; removably attaching the support base to the cover in such a manner that the carrying case is selectively configurable between closed and open positions; providing and selectively situating a chop saw outside and inside of the carrying case when the carrying case is configured at the open and closed positions, respectively; configuring the carrying case to the closed position by positioning each of the cover and the support base at a respective upright orientation; and configuring the carrying case to the open position by positioning the support base at the upright orientation and the cover at an inverted orientation, thereby defining a work table such that the chop saw is contemporaneously exposed above the cover and the support base.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
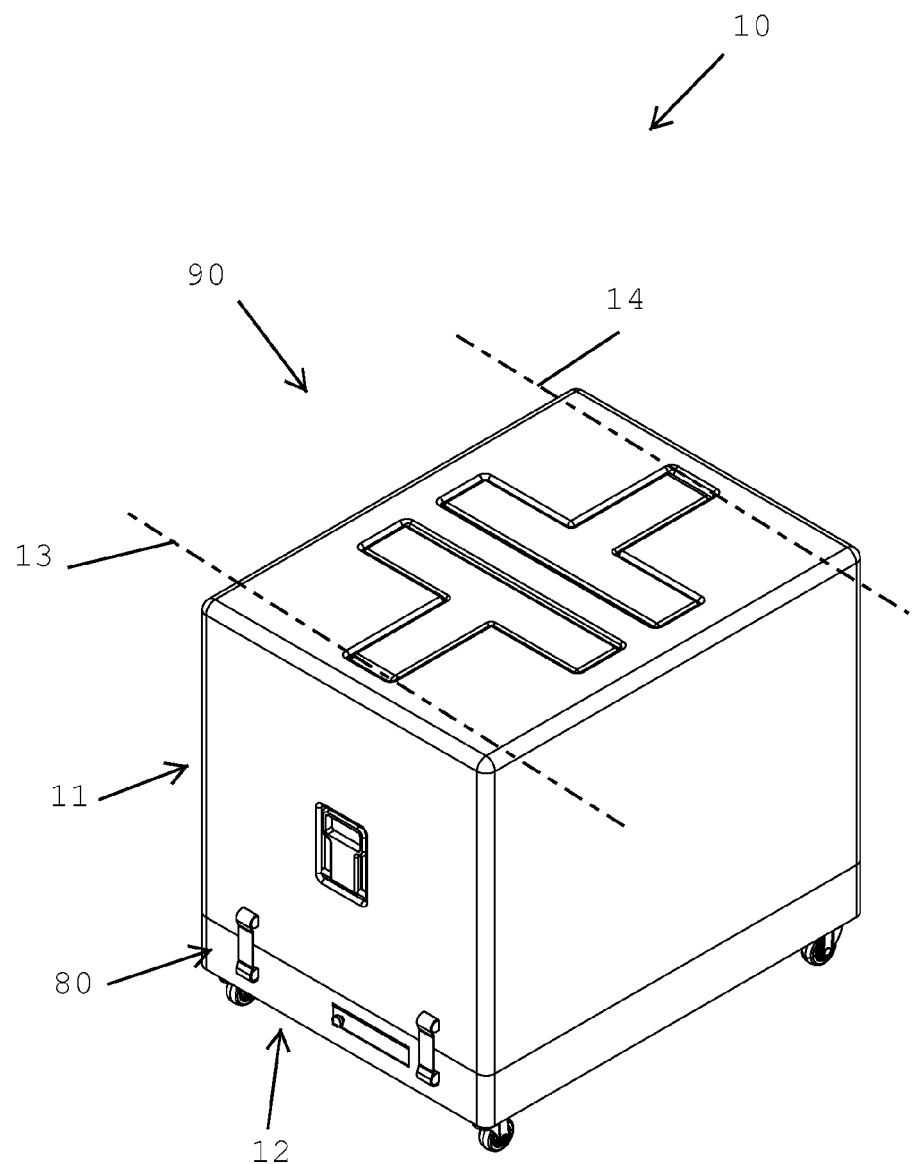
FIG. 1 is a perspective view showing a combined chop saw and work table at a closed (inoperable) position, in accordance with the non-limiting exemplary embodiment(s)

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary emboidment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

Figure 2:
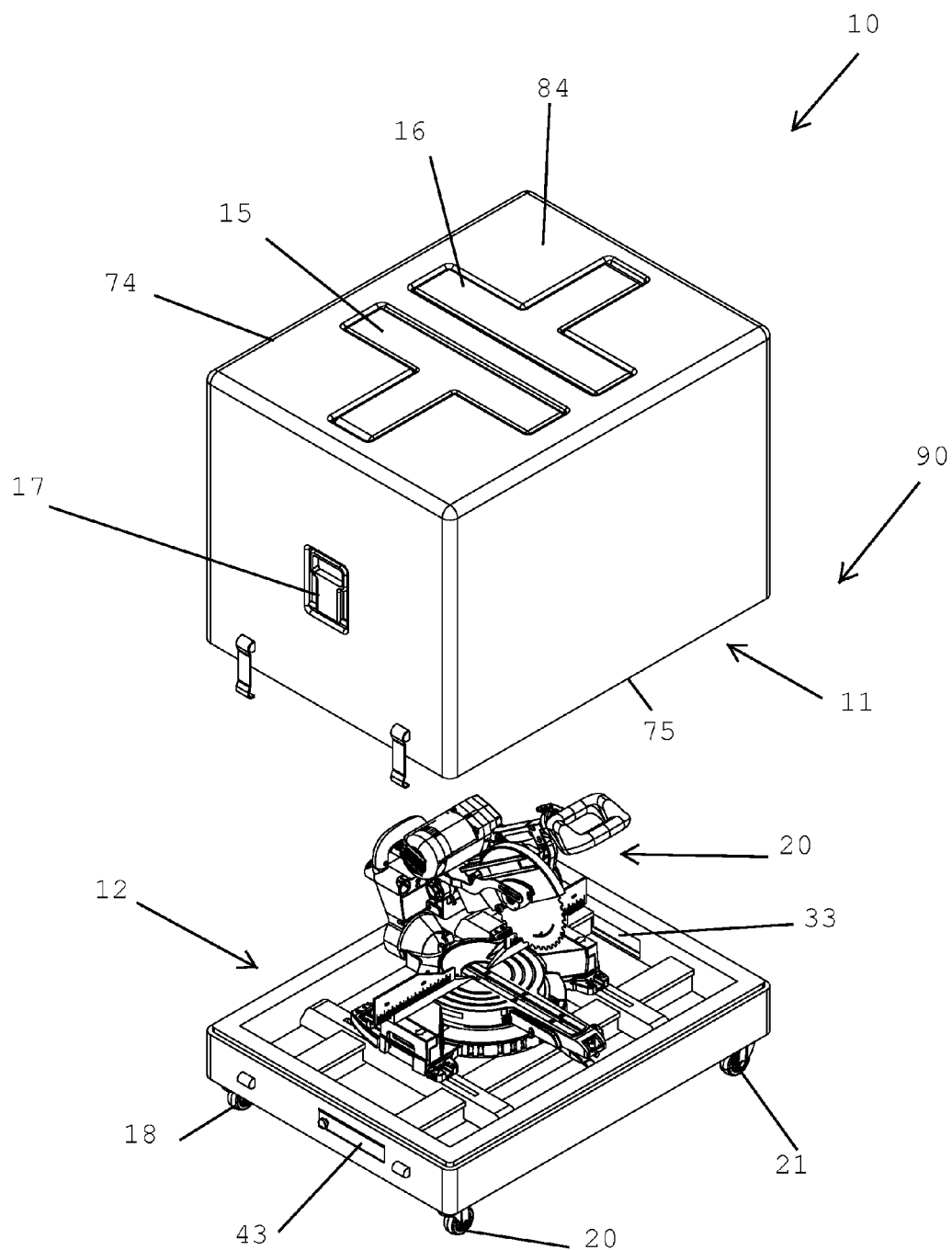
FIG. 2 is an exploded view of the combined chop saw and work table shown in FIG. 1 wherein the cover is at an upright orientation and lifted off a top perimeter edge of the base.
Figure 3:
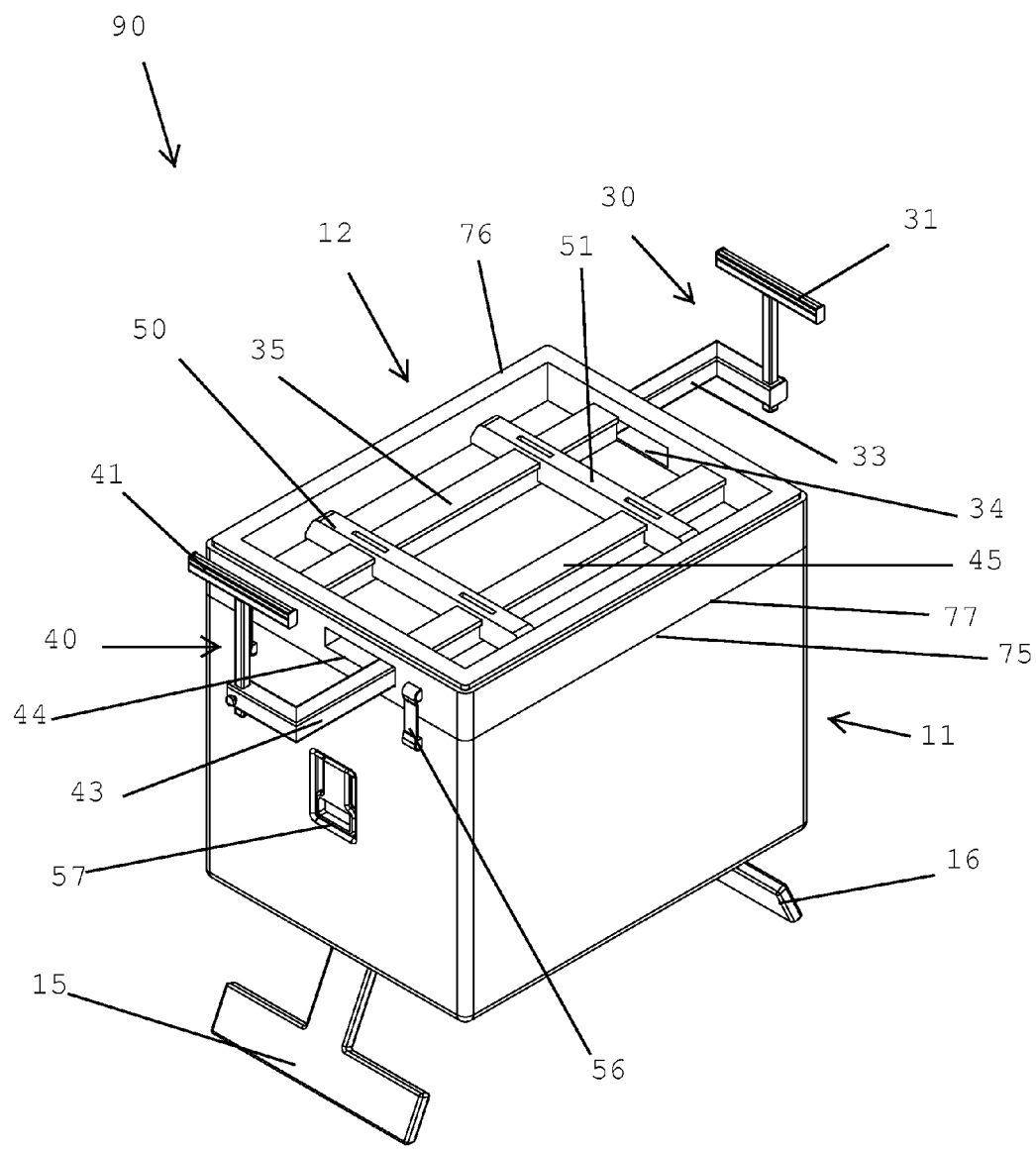
FIG. 3 is a perspective view showing the work table at an open (operable) position wherein the cover is at an inverted orientation and the base is seated directly on the cover.
Figure 4:
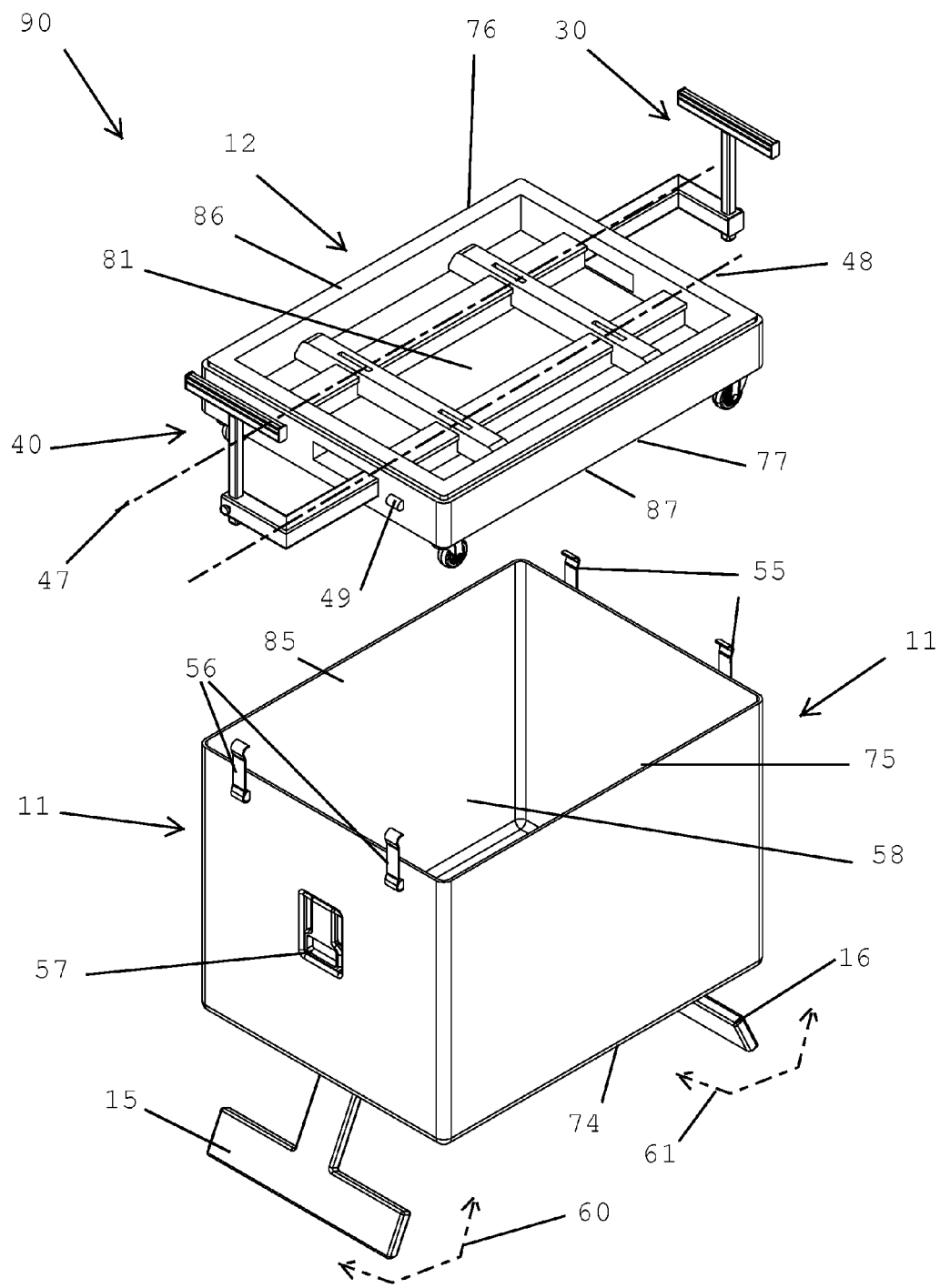
FIG. 4 is an exploded view of the work table shown in FIG. 3 wherein the cover is oriented at the inverted position and the base is lifted off a bottom perimeter edge of the cover.
Figure 5:
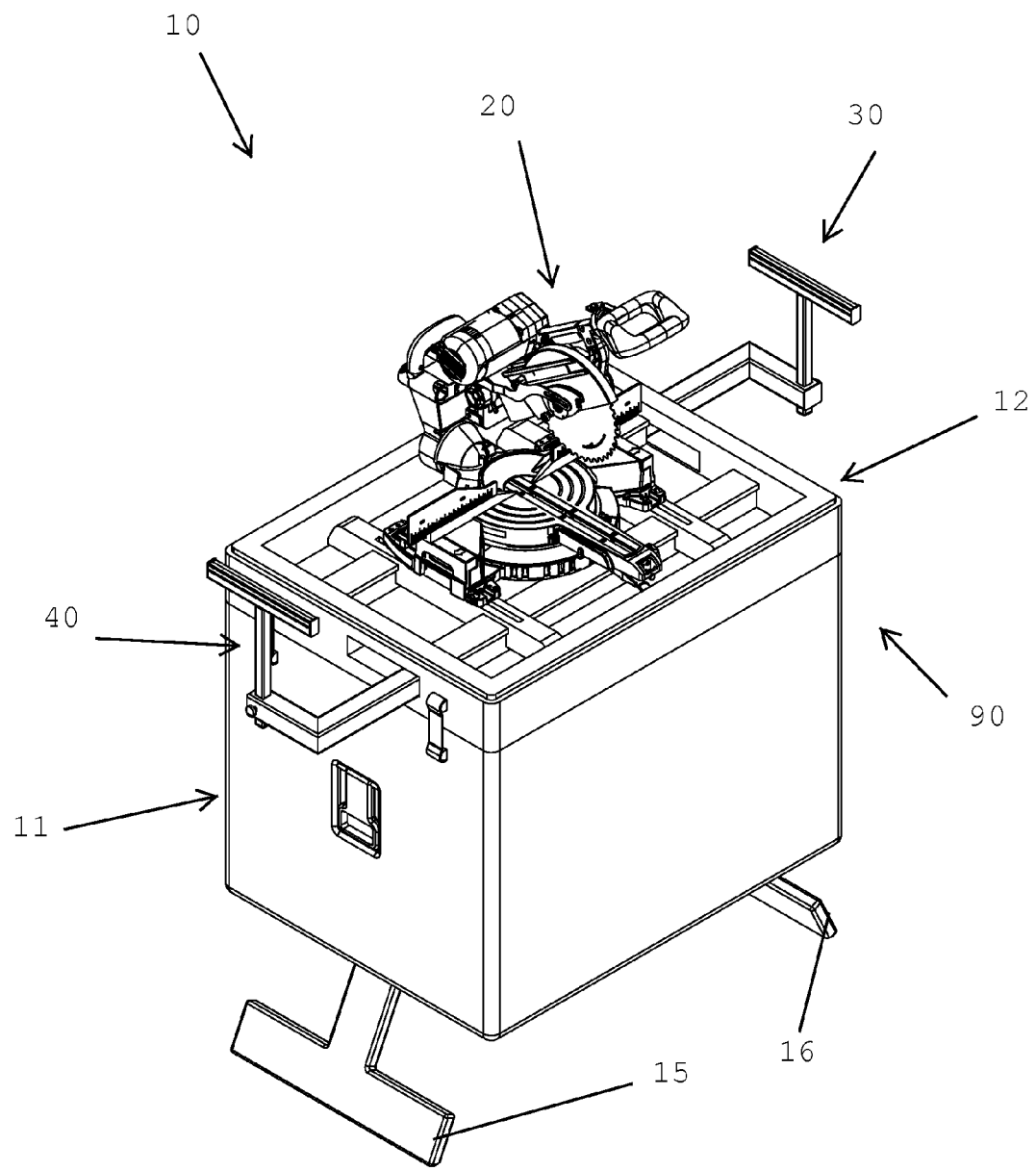
FIG. 5 is a perspective view of the combined chop saw and work table wherein the chop saw is located directly on the base of the work table, which is disposed at the open (operable) position.

The non-limiting exemplary embodiment(s) is/are referred to generally in FIGS. 1-5 and is/are intended to provide a portable chop saw work table. It should be understood that such non-limiting exemplary embodiment(s) may be used to transport and store a chop saw in addition to enabling a quick set up of the portable worktable for use with the saw and many different types of cutting devices, and should not be limited to the uses described herein.

Referring to FIGS. 1-5, the combined chop saw and work table 10 includes a carrying case 90 having a cover 11 and a support base 12 removably attached thereto in such a manner that the carrying case 90 is selectively configured between closed and open positions. The chop saw 20 is selectively situated outside and inside of the carrying case 90 when the carrying case 90 is configured at the open and closed positions, respectively. Advantageously, when the carrying case 90 is at the closed position (FIG. 1), each of the cover 11 and the support base 12 are at a respective upright orientation. When the carrying case 90 is at the open position (FIG. 3), the support base 12 is at the upright orientation and the cover 11 is at an inverted orientation. In this manner, the carrying case 90 defines a work table when configured to the open position such that the chop saw 20 is contemporaneously exposed above the cover 11 and the support base 12.

In a non-limiting exemplary embodiment, the cover 11 preferably includes a closed top side 84 provided with a top edge 74 extending along an entire perimeter of the closed top side 84. An open bottom side 85 is provided with a bottom edge 75 extending along an entire perimeter of the open bottom side 85. First and second legs 15, 16 are pivotally coupled to the closed top side 84, and a compartment 58 is formed between the closed top side 84 and the open bottom side 85. Advantageously, the first and second legs 15, 16 independently pivot along mutually exclusive first and second arcuate paths 60, 61 defined about first and second fulcrum axes 13, 14, respectively. Notably, the first fulcrum axis 13 is registered parallel to the second fulcrum axis 14 and the first and second arcuate paths 60, 61 are located exterior of the compartment 58.

In a non-limiting exemplary embodiment, the cover 11 further includes a transport handle 57 attached to an outer surface of the cover 11.

In a non-limiting exemplary embodiment, the support base 12 includes an upper side 86 provided with an upper rim 76 extending along an entire perimeter of the upper side 86. A lower side 87 of the support base 12 is provided with a lower rim 77 extending along an entire perimeter of the lower side 87. A plurality of wheels 18 are pivotally coupled to the opposed corners of the lower side 87 of support base 12. First and second rectilinear slots 34, 44 are oppositely formed between the upper and lower sides 86, 87, and a cavity 81 is formed between the upper and lower sides 86, 87. First and second rectilinear support bars 50, 51 are statically situated within the cavity 81. In this manner, the chop saw 20 is directly supported on the first and second rectilinear support bars 50, 51 and extends above the upper side 86 of the support base 12.

In a non-limiting exemplary embodiment, the support base 12 further includes oppositely disposed first and second work table handles 30, 40 slidably displaced through the first and second rectilinear slots 34, 44 such that the work table handles 30, 40 are independently retracted and extended towards and away from the cavity 81, respectively. Linear displacement occurs along mutually exclusive rectilinear travel paths 47, 48 passing through cavity 81.

In a non-limiting exemplary embodiment, each of the first and second work table handles 30, 40 preferably includes a rectilinear female portion 35, 45 situated entirely within the cavity 81. L-shaped male portions 33, 43 are slidably displaced within the rectilinear female portion 35, 45 as well as a corresponding one of the first and second rectilinear slots 34, 44. T-shaped grip portions 31, 41 are coupled to the L-shaped male portion 33, 43 and oriented perpendicular thereto. Notably, each T-shaped grip portion 31, 41 is detachable from the L-shaped male portion 33, 43 such that the L-shaped male portion 33, 43 interfits within the corresponding rectilinear slot 34, 44 while the carrying case 90 is configured at the closed position.

In a non-limiting exemplary embodiment, the carrying case 90 further includes a locking mechanism 80 securing the bottom edge 75 of the carrying case 90 to the upper rim 76 of the support base 12 while the carrying case 90 is configured at the closed position. Such a locking mechanism 80 includes a plurality of straps 56 attached to the cover 11 and a plurality of clips 49 attached to the support base 12. Such straps 56 are removably coupled to the clips 49 for locking and unlocking the cover 11 to support base 12.

In a non-limiting exemplary embodiment, the first and second legs 15, 16 are articulated to an outwardly deployed position and thereby elevate the top side of the cover 11 above a ground surface while the cover 11 is at the inverted orientation.

In a non-limiting exemplary embodiment, the lower rim 77 of the support base 12 contiguously lies directly along the bottom edge 75 of the inverted cover 11 while the carrying case 90 is configured to the open position and the first and second legs 15, 16 are at the outwardly deployed positions, respectively.

The present disclosure further includes a method of utilizing a combined chop saw 20 and work table. Such a method includes the chronological steps of: providing a carrying case 90 having a cover 11 and a support base 12; removably attaching the support base 12 to the cover 11 in such a manner that the carrying case 90 is selectively configurable between closed and open positions; providing and selectively situating a chop saw 20 outside and inside of the carrying case 90 when the carrying case 90 is configured at the open and closed positions, respectively; configuring the carrying case 90 to the closed position by positioning each of the cover 11 and the support base 12 at a respective upright orientation; and configuring the carrying case 90 to the open position by positioning the support base 12 at the upright orientation and the cover 11 at an inverted orientation, thereby defining a work table (inverted cover 11 and upright support base 12) such that the chop saw 20 is contemporaneously exposed above the cover 11 and the support base 12.

In a non-limiting exemplary embodiment, the carrying case 90 may be rectangular in shape, measuring 34 inches in width (side to side) by 26 inches in width (on sides), and 28 inches in depth (height when closed). The carrying case 90 may be opened and assembled to reach a height of at least 36 inches and may be adjustable up to 42 inches. The carrying case 90 may further be produced in a strong lightweight aluminum alloy, in a sturdy injection-molded thermoplastic, or in wood.

In a non-limiting exemplary embodiment, the interior of the carrying case 90 may include a recessed, form-fitting compartment 58 into which the chop saw 20 may snugly fit in for transport. The carrying case 90 may include additional compartments (not shown) to accommodate blades and other common accessories. The cover 11 may include a secure locking mechanism 80. When closed for transport, the carrying case 90 may roll on rubber wheels 18, of which two may swivel at 360° and the other two may not swivel. The wheels 18 may be set in the bottom corners of the carrying case 90. A hinged, recessed pull handle 57 may further be incorporated into both ends of the carrying case 90.

When the portable chop saw and work table 10 is brought to the location to be used, the carrying case 90 may be converted into a work table in just a few simple steps. The legs 15, 16 set flush against the top of the carrying case 90 during transportation and may be articulated into the deployed position. Next, cover 11 may be flipped over. The chop saw 20 may be attached to the support base 12 and may be lifted and placed on top of the inverted cover 11 with the wheels 18 fitting into compartment 58, securing it in place. In this way, the top of the work table (i.e. support base 12 during transport) may act as the working surface for the apparatus 10.

The combined chop saw and work table 10 offers a number of distinct and significant benefits and advantages for users. For example, the apparatus 10 provides safe and secure storage and transport of a very important and expensive piece of equipment (i.e., chop saw 20). Solid and heavy-built, the apparatus 10 holds the chop saw 20 securely in a dedicated, recessed compartment 58 and other compartments may be provided to hold the extra blades, blade wrenches, extension cords, and other accessories that go with the chop saw 20. The hinged, recessed handles 57 allow for easy pulling of the apparatus 10 and the 360° caster-type wheels 18 enable the apparatus 10 to be easily maneuvered and positioned. This apparatus 10 enables a user to set up a chop saw 20 virtually anywhere electrical power is available, and yet enjoy all the stability and control of a wood shop work table.

Once on site, release the locking mechanism 80 to separate cover 11 from support base 12. The legs 15, 16 may be deployed on top of cover 11 and secured in place at the desired angle. The cover 11 may next be flipped over so that the legs 15, 16 are sitting on the floor. The support base 12 may next be placed on the top of cover 11, which may be form fitted to allow for the chop saw 20 to be secured. Finally, the telescoping variable length work bench handles 30, 40 may be slid out to stabilize the material being handled by the chop saw 20.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. §1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A combined chop saw and work table comprising:
   a carrying case having a cover and a support base removably attached thereto in such a manner that said carrying case is selectively configured between closed and open positions; and
   a chop saw selectively situated outside and inside of said carrying case when said carrying case is configured at said open and closed positions, respectively;
   wherein, when said carrying case is at said closed position, each of said cover and said support base are at a respective upright orientation;
   wherein, when said carrying case is at said open position, said support base is at said upright orientation and said cover is at an inverted orientation;
   wherein said cover comprises
      a closed top side provided with a top edge extending along an entire perimeter of said closed top side;
      an open bottom side provided with a bottom edge extending along an entire perimeter of said open bottom side;
      first and second legs pivotally coupled to said closed top side; and
      a compartment formed between said closed top side and said open bottom side;
      wherein said first and second legs independently pivot along mutually exclusive first and second arcuate paths defined about first and second fulcrum axes respectively;
      wherein said first fulcrum axis is registered parallel to said second fulcrum axis;
      wherein said first and second arcuate paths are located exterior of said compartment;
   wherein said support base comprises
      an upper side provided with an upper rim extending along an entire perimeter of said upper side;
      a lower side provided with a lower rim extending along an entire perimeter of said lower side;
      a plurality of wheels pivotally coupled to said opposed corners of said lower side;
      first and second rectilinear slots oppositely formed between said upper and lower sides;
      a cavity formed between said upper and lower sides; and
      first and second rectilinear support bars statically situated within said cavity;
      wherein said chop saw is directly supported on said first and second rectilinear support bars and extends above said upper side of said support base.

2. The combined chop saw and work table of claim 1, wherein said cover further comprises:
   a transport handle attached to an outer surface of said cover.

3. The combined chop saw and work table of claim 1, wherein said support base further comprises: oppositely disposed first and second work table handles slidably displaced through said first and second rectilinear slots such that said work table handles are independently retracted and extended towards and away from said cavity, respectively.

4. The combined chop saw and work table of claim 3, wherein each of said first and second work table handles comprises:
   a rectilinear female portion situated entirely within said cavity;
   an L-shaped male portion slidably displaced within said rectilinear female portion as well as a corresponding one of said first and second rectilinear slots; and
   a T-shaped grip portion coupled to said L-shaped male portion and oriented perpendicular thereto;
   wherein said T-shaped grip portion is detachable from said L-shaped male portion such that said L-shaped male portion interfits within said corresponding rectilinear slot while said carrying case is configured at said closed position.

5. The combined chop saw and work table of claim 4, wherein said carrying case further comprises: a locking mechanism securing said bottom edge of said carrying case to said upper rim of said support base while said carrying case is configured at the closed position, said locking mechanism including a plurality of straps attached to said cover and a plurality of clips attached to said support base;
   wherein said straps are removably coupled to said clips.

6. The combined chop saw and work table of claim 5, wherein said first and second legs are articulated to an outwardly deployed position and thereby elevate said top side of said cover above a ground surface while said cover is at the inverted orientation.

7. The combined chop saw and work table of claim 6, wherein said lower rim of said support base contiguously lies directly along said bottom edge of said cover while said carrying case is configured to the open position and said first and second legs are at the outwardly deployed position respectively.

8. A combined chop saw and work table comprising:
   a carrying case having a cover and a support base removably attached thereto in such a manner that said carrying case is selectively configured between closed and open positions; and
   a chop saw selectively situated outside and inside of said carrying case when said carrying case is configured at said open and closed positions, respectively;
   wherein, when said carrying case is at said closed position, each of said cover and said support base are at a respective upright orientation;
   wherein, when said carrying case is at said open position, said support base is at said upright orientation and said cover is at an inverted orientation;
   wherein said carrying case defines a work table when configured to said open position such that said chop saw is contemporaneously exposed above said cover and said support base;
   wherein said cover comprises
      a closed top side provided with a top edge extending along an entire perimeter of said closed top side;
      an open bottom side provided with a bottom edge extending along an entire perimeter of said open bottom side;
      first and second legs pivotally coupled to said closed top side; and
      a compartment formed between said closed top side and said open bottom side;
      wherein said first and second legs independently pivot along mutually exclusive first and second arcuate paths defined about first and second fulcrum axes respectively;
      wherein said first fulcrum axis is registered parallel to said second fulcrum axis;
      wherein said first and second arcuate paths are located exterior of said compartment;
   wherein said support base comprises
      an upper side provided with an upper rim extending along an entire perimeter of said upper side;
      a lower side provided with a lower rim extending along an entire perimeter of said lower side;
      a plurality of wheels pivotally coupled to said opposed corners of said lower side;
      first and second rectilinear slots oppositely formed between said upper and lower sides;
      a cavity formed between said upper and lower sides; and
      first and second rectilinear support bars statically situated within said cavity;
      wherein said chop saw is directly supported on said first and second rectilinear support bars and extends above said upper side of said support base.

9. The combined chop saw and work table of claim 8, wherein said cover further comprises:
   a transport handle attached to an outer surface of said cover.

10. The combined chop saw and work table of claim 8, wherein said support base further comprises: oppositely disposed first and second work table handles slidably displaced through said first and second rectilinear slots such that said work table handles are independently retracted and extended towards and away from said cavity, respectively.

11. The combined chop saw and work table of claim 10, wherein each of said first and second work table handles comprises:
   a rectilinear female portion situated entirely within said cavity;
   an L-shaped male portion slidably displaced within said rectilinear female portion as well as a corresponding one of said first and second rectilinear slots; and
   a T-shaped grip portion coupled to said L-shaped male portion and oriented perpendicular thereto;
   wherein said T-shaped grip portion is detachable from said L-shaped male portion such that said L-shaped male portion interfits within said corresponding rectilinear slot while said carrying case is configured at said closed position.

12. The combined chop saw and work table of claim 11, wherein said carrying case further comprises: a locking mechanism securing said bottom edge of said carrying case to said upper rim of said support base while said carrying case is configured at the closed position, said locking mechanism including a plurality of straps attached to said cover and a plurality of clips attached to said support base;
   wherein said straps are removably coupled to said clips.

13. The combined chop saw and work table of claim 12, wherein said first and second legs are articulated to an outwardly deployed position and thereby elevate said top side of said cover above a ground surface while said cover is at the inverted orientation.

14. The combined chop saw and work table of claim 13, wherein said lower rim of said support base contiguously lies directly along said bottom edge of said cover while said carrying case is configured to the open position and said first and second legs are at the outwardly deployed position respectively.

* * * * *